US 11,874,143 B2

United States Patent
Coyne et al.

(10) Patent No.: US 11,874,143 B2
(45) Date of Patent: Jan. 16, 2024

(54) DUAL ABSOLUTE ENCODER

(71) Applicant: HARMONIC DRIVE SYSTEMS INC., Tokyo (JP)

(72) Inventors: Brian Coyne, Marblehead, MA (US); Yuki Katoh, Nagano (JP)

(73) Assignee: HARMONIC DRIVE SYSTEMS INC., Tokyo (JP)

(*) Notice: Subject to any disclaimer, the term of this patent is extended or adjusted under 35 U.S.C. 154(b) by 0 days.

(21) Appl. No.: 17/838,922

(22) Filed: Jun. 13, 2022

(65) Prior Publication Data

US 2022/0381549 A1 Dec. 1, 2022

Related U.S. Application Data

(63) Continuation of application No. 17/338,799, filed on Jun. 4, 2021, now Pat. No. 11,359,938, which is a
(Continued)

(51) Int. Cl.
*G01D 5/24* (2006.01)
*G01D 5/14* (2006.01)
(Continued)

(52) U.S. Cl.
CPC ............ *G01D 5/2497* (2013.01); *G01B 7/003* (2013.01); *G01B 7/30* (2013.01); *G01D 5/145* (2013.01)

(58) Field of Classification Search
CPC ............ G01D 5/2457; G01D 5/24476; G01D 5/2497; G01D 5/145; G01D 5/2451; G01B 7/003
See application file for complete search history.

(56) References Cited

U.S. PATENT DOCUMENTS 4,262,526 A 4/1981 Makita et al.
4,491,776 A 1/1985 Veale
(Continued)

FOREIGN PATENT DOCUMENTS

CN 1616971 A 5/2005
CN 1987387 A 6/2007
(Continued)

OTHER PUBLICATIONS

Office Action (Notice of Reasons for Refusal) dated Jun. 17, 2022, in Japanese Patent Application No. 2021-532137 and English translation of the Office Action. (15 pages).
(Continued)

*Primary Examiner* — Reena Aurora
(74) *Attorney, Agent, or Firm* — BUCHANAN INGERSOLL & ROONEY PC

(57) ABSTRACT

An exemplary encoder assembly includes a substrate, a first encoder, and a second encoder. The substrate has two or more position sensors, each position sensor being configured for detecting a rotary position of a shaft or other rotating element of a machine. The first encoder includes at least one first position sensor of the two or more position sensors. The at least one first position sensor is disposed on the substrate for off-axis alignment with the shaft or other rotating element of the machine. The second encoder includes a second position sensor of the two or more position sensors, the second position sensor being disposed on the substrate for on-axis or off-axis alignment with the shaft or other rotating element of the machine. Each position sensor is configured to detect different or common signal types, and a signal type of the second position sensor excludes optical signals.

17 Claims, 18 Drawing Sheets

Related U.S. Application Data continuation of application No. PCT/US2018/064182, filed on Dec. 6, 2018.

(51) Int. Cl.
  *G01B 7/00* (2006.01)
  *G01D 5/249* (2006.01)
  *G01B 7/30* (2006.01)

(56) References Cited

U.S. PATENT DOCUMENTS

| | | | |
|---|---|---|---|
| 5,107,388 | A | 4/1992 | Murata et al. |
| 5,689,994 | A | 11/1997 | Nagai et al. |
| 7,023,203 | B2 | 4/2006 | Miyashita et al. |
| 7,841,583 | B1 | 11/2010 | Kureck |
| 9,046,384 | B2 | 6/2015 | Yamazaki et al. |
| 9,379,598 | B2 | 6/2016 | Someya et al. |
| 2003/0128026 | A1 | 7/2003 | Lutz |
| 2004/0004475 | A1* | 1/2004 | Goldfine .............. G01N 27/902 324/242 |
| 2004/0193988 | A1 | 9/2004 | Saloio |
| 2005/0168187 | A1 | 8/2005 | Uchiyama et al. |
| 2009/0140731 | A1 | 6/2009 | Miyashita et al. |
| 2010/0156402 | A1 | 6/2010 | Straubinger et al. |
| 2010/0180664 | A1 | 7/2010 | Wilhelmy et al. |
| 2010/0269481 | A1 | 10/2010 | Snider et al. |
| 2011/0309824 | A1 | 12/2011 | Takahashi et al. |
| 2012/0217956 | A1 | 8/2012 | Parakka |
| 2012/0229127 | A1 | 9/2012 | Koto et al. |
| 2013/0218517 | A1 | 8/2013 | Ausserlechner |
| 2013/0257230 | A1 | 10/2013 | Park et al. |
| 2014/0015384 | A1* | 1/2014 | Someya .............. H02K 11/215 310/68 B |
| 2014/0230539 | A1 | 8/2014 | Perju et al. |
| 2015/0369636 | A1 | 12/2015 | Deak et al. |
| 2017/0038228 | A1 | 2/2017 | Mikkelson |
| 2017/0146365 | A1 | 5/2017 | Hanke et al. |
| 2017/0167891 | A1* | 6/2017 | Maeda .............. G01D 5/14 |
| 2017/0343380 | A1 | 11/2017 | Liu et al. |
| 2018/0172421 | A1* | 6/2018 | Hoell, Jr. ........... G01R 33/0094 |
| 2018/0245947 | A1 | 8/2018 | Ausserlechner |
| 2019/0250011 | A1 | 8/2019 | Isoda et al. |
| 2020/0292360 | A1 | 9/2020 | Kettering |
| 2021/0023697 | A1* | 1/2021 | Watanabe .............. B25J 9/04 |
| 2021/0199470 | A1* | 7/2021 | Kitagawa .............. G01R 15/202 |
| 2021/0310834 | A1 | 10/2021 | Coyne et al. |

FOREIGN PATENT DOCUMENTS

| | | |
|---|---|---|
| CN | 101000251 A | 7/2007 |
| CN | 104006766 A | 8/2014 |
| CN | 104482948 A | 4/2015 |
| CN | 104748840 A | 7/2015 |
| CN | 107110670 A | 8/2017 |
| CN | 108885123 A | 11/2018 |
| EP | 1489038 A1 | 12/2004 |
| JP | H07133855 A | 5/1995 |
| JP | 2004294362 A | 10/2004 |
| JP | 2009540277 A | 11/2009 |
| JP | 2009287624 A | 12/2009 |
| JP | 2012225678 A | 11/2012 |
| JP | 2014512012 A | 5/2014 |
| TW | 201303266 A | 1/2013 |
| WO | 2012141950 A3 | 4/2013 |
| WO | 2018078855 A1 | 5/2018 |

OTHER PUBLICATIONS

International Search Report (PCT/ISA/210) and Written Opinion (PCT/ISA/237) dated Feb. 26, 2019, by the U.S. Patent Office as the International Searching Authority for International Application No. PCT/US2018/064182.

Office Action dated May 17, 2022, in corresponding Taiwanese Patent Application No. 11120458490. (9 pages).

Zhang, Z., "A Method for Meausrement of Absolute Angular Position and Application in a Novel Electromagnetic Encoder System", Journal of Sensors, vol. 2015, No. 503852, Publication [online], 2015 [retrieved Jan. 23, 2019], retrieved from the internet: http://downloads.hindawi.com/journals/js/2015/503852.pdf, pp. 1.11.

Office Action (Decision to Grant a Patent) dated Nov. 11, 2022, in corresponding Japanese Patent Application No. 2021-532137 and English translation of the Office Action. (5 pages).

Office Action (Notice of Allowance) dated Feb. 2, 2023, in Taiwanese Patent Application No. 107143876 and English translation of the Office Action. (3 pages).

Office Action dated Jul. 27, 2023, in corresponding Taiwanese Patent Application No. 112116018. (5 pages).

Office Action dated Jun. 15, 2023, in corresponding Chinese Patent Application No. 201880100448.7 and English translation of the Office Action. (23 pages).

Office Action dated Dec. 9, 2022, in corresponding Chinese Patent Application No. 201880100448.7. (8 pages).

Extended European Search Report dated Jun. 22, 2022, issued in corresponding European Application No. 18942291.8. (7 pages).

* cited by examiner

DUAL ABSOLUTE ENCODER

RELATED APPLICATION

This application is a continuation of U.S. application Ser. No. 17/338,799 filed on Jun. 4, 2021, which is a continuation of International Application No. PCT/US2018/064182 filed Dec. 6, 2018.

FIELD OF THE INVENTION

The present disclosure relates generally to an absolute encoder, and particularly to a dual magnetic absolute encoder.

BACKGROUND OF THE INVENTION

Encoders have a wide variety of uses in products which require speed and/or position control for motors. An encoder is a type of transducer that converts linear or angular mechanical motion into an electrical signal. A linear encoder can be used to measure and indicate the position of a movable member. A rotary encoder is used to measure the angular position of a rotating member of a device or system. In robotic systems, for example, a rotary encoder can be used to detect the position of a rotating shaft, which can be connected to move a robotic arm. Absolute encoders are popular in these types of systems because of a capability to determine an actual or absolute position. The absolute encoder can at all times provide a reliable indication of a true position of the motor shaft of a component to which it is attached.

An absolute encoder uses a sequence of positional codes stored in binary form on a code disk and a single or plurality of sensors that read the positional codes. A linear encoder uses an elongated component having lengthwise parallel code tracks. A rotary encoder uses code disks having one or more concentric code tracks. Sensors are used to read the codes. The sensors can use any of optical, magnetic, inductive, capacitive or direct contact as a manner of reading the codes. The type of sensors used can depend on the application and/or environment in which the system will operate.

SUMMARY OF THE INVENTION

An exemplary embodiment of the present disclosure is directed to an encoder assembly, comprising: a substrate having two or more position sensors, each position sensor being configured for detecting a rotary position of a shaft or other rotating element of a machine; a first encoder including at least one first position sensor of the two or more position sensors, the at least one first position sensor being disposed on the substrate for off-axis alignment with the shaft or other rotating element of the machine; and a second encoder including a second position sensor of the two or more position sensors, the second position sensor being disposed on the substrate for on-axis or off-axis alignment with the shaft or other rotating element of the machine, wherein each position sensor is configured to detect different or common signal types, and a signal type of the second position sensor excludes optical signals.

An exemplary encoder assembly comprising: a code disk configured for attachment to the shaft or other rotating element of the machine, wherein the at least one first position sensor and the second position sensor are disposed on the substrate to be planar with an axial surface of the code disk, and wherein the code disk, the at least one first position sensor, and the second position sensor form dual multi-turn absolute encoders.

An exemplary encoder assembly comprising: a code disk configured for attachment to the shaft or other rotating element of the machine, wherein the substrate includes a first portion configured to be parallel with an axial surface of the code disk and a second portion configured to be parallel with a radial surface of the code disk, and wherein the at least one first position sensor is disposed on the second portion of the substrate and the second position sensor is disposed on the first portion of the substrate.

An exemplary encoder assembly comprising: a code disk including a first code disk configured to be disposed within a hollow volume of the shaft or other rotating element of the machine, and a second code disk configured for attachment to a surface of the shaft or other rotating element of the machine, wherein the at least one first position sensor is disposed on the substrate for detecting a signal from the second code disk, and the second position sensor is disposed on the substrate for on-axis alignment with the shaft or other rotating element of the machine to detect a signal from the first code disk, and wherein the at least one first position sensor is configured to detect a signal from an axial or radial surface of the second code disk.

An exemplary encoder assembly comprising: a code disk including a first code disk configured to be disposed within a hollow volume of the shaft or other rotating element of the machine, and a second code disk configured for attachment to a surface of the shaft or other rotating element of the machine, the substrate includes a first portion configured to be parallel with an axial surface of the first code disk and a second portion configured to be parallel with a radial surface of the second code disk, and the at least one first position sensor is disposed on the second portion of the substrate for detecting a signal from the radial surface of the second code disk and the second position sensor is disposed on the first portion of the substrate for detecting a signal from an axial surface of the first code disk.

An exemplary encoder assembly comprising: a code disk including a first code disk and a second code disk configured for attachment to a surface of the shaft or other rotating element of the machine, wherein the substrate includes a first portion configured to be parallel with a radial surface of the first code disk, a second portion configured to be parallel with a radial surface of the second code disk, and a third portion extending between the first and second portions, wherein the at least one first position sensor is disposed on the first portion of the substrate for detecting a signal from the radial surface of the first code disk, the second position sensor is disposed on the second portion of the substrate for detecting a signal from the radial surface of the second code disk, and circuitry is mounted to the third portion of the substrate, and wherein the first and second portions of the substrate are parallel with an axis of the shaft and orthogonal to the third portion.

An exemplary encoder assembly wherein the at least one first position sensor and the second position sensor are embedded within layers of the substrate.

An exemplary encoder assembly wherein the two or more position sensors are connected to a common bus or separate data lines, and wherein the common bus and the separate data lines are configured to communicate position data and/or clock signals and/or other data.

An exemplary encoder assembly wherein the first encoder is a magnetic encoder, a capacitive encoder, an inductive encoder, or an optical encoder, and the second encoder, disposed on the substrate for on-axis or off-axis alignment with the shaft or other rotating element of the machine, is a magnetic encoder, a capacitive encoder, or an inductive encoder.

An exemplary encoder assembly connected in combination with a controller, wherein: the controller is configured to detect a fault based on rotary positions detected by the two or more position sensors, and the controller is configured to compare the rotary positions detected by the two or more position sensors and generate a fault signal when the compared rotary positions are outside a predetermined tolerance.

An exemplary encoder assembly wherein the substrate includes a power circuit connected to the first and second encoders, the power circuit being configured to provide circuit protection at least against power surges.

Another exemplary embodiment of the present disclosure is directed to an actuator assembly, comprising: a motor having a motor shaft and an output shaft coaxial with the motor shaft; and an encoder assembly including: a first encoder configured in off-axis alignment with the motor shaft; a second encoder configured in on-axis or off-axis alignment with the motor shaft; and a common substrate on which position sensors of the first encoder and the second encoder are mounted, wherein the common substrate is configured to communicate position data from the position sensors, and wherein each position sensor is configured to detect different or common signal types, and a signal type of the second encoder excludes optical signals.

An exemplary actuator assembly wherein the second encoder, if in on-axis alignment with the motor shaft, includes a first code disk disposed in a hollow volume of the output shaft and the first encoder includes a second code disk attached to a surface of the motor shaft.

An exemplary actuator assembly wherein the second encoder, if in off-axis alignment with the motor shaft, includes a second position sensor configured to detect signals from an axial surface of the first code disk.

An exemplary actuator assembly wherein the common substrate includes a first portion on which a second position sensor of the second encoder is mounted for detecting signals from an axial surface of the first code disk, and a second portion on which a first position sensor of the first encoder is mounted for detecting signals from a radial surface of the second code disk, and wherein the second portion of the common substrate is perpendicular to the first portion of the common substrate.

An exemplary actuator assembly wherein the encoder assembly includes a controller configured to control the operation of the actuator assembly based on the position data detected by the position sensors, wherein the controller is mounted on the common substrate.

An exemplary actuator assembly wherein the controller is configured to detect a fault based on rotary positions of the motor shaft detected by the second encoder and rotary positions of the output shaft detected by the first encoder, and wherein the controller is configured to compare the rotary positions of the motor shaft and the output shaft and generate a fault signal when the compared rotary positions are outside a predetermined tolerance.

An exemplary actuator assembly wherein the first encoder is a magnetic encoder, a capacitive encoder, an inductive encoder, or an optical encoder and the second encoder, in on-axis or off-axis alignment with the motor shaft, is a magnetic encoder, a capacitive encoder, or an inductive encoder.

An exemplary actuator assembly wherein the first encoder and the second encoder are absolute encoders.

An exemplary actuator assembly wherein each position sensor is disposed on the common substrate to detect a signal from an axial surface of a respective code disk.

An exemplary actuator assembly wherein: the first encoder including a first position sensor disposed on the common substrate to detect a signal from a radial surface of a first code disk; and the second encoder including a second position sensor disposed on the common substrate to detect a signal from an axial surface of a second code disk, wherein the substrate includes a first portion on which the second position sensor is mounted for detecting signals from the axial surface of the second code disk, and a second portion on which the first position sensor is mounted for detecting signals from the radial surface of the first code disk.

An exemplary actuator assembly wherein: the first encoder including a first position sensor disposed on the common substrate to detect a signal from a radial surface of a first code disk, the second encoder including a second position sensor disposed on the common substrate to detect a signal from a radial surface of a second code disk, wherein the common substrate includes a first portion on which the first position sensor is mounted for detecting signals from the radial surface of the first code disk, and a second portion on which the second position sensor is mounted for detecting signals from the radial surface of the second code disk, and a third portion extending between the first and second portions on which encoder circuitry is mounted, wherein the first and second portions of the substrate are parallel with an axis of the motor shaft and orthogonal to the third portion.

An exemplary actuator assembly wherein the position sensors are connected to a common bus or separate data lines, and wherein the common bus and separate data lines are configured to communicate position data and/or clock signals and/or other data.

An exemplary actuator assembly connected in combination with the controller, wherein the controller is configured to detect a fault based on rotary positions detected by two or more position sensors, and wherein the controller is configured to compare the rotary positions detected by the two or more position sensors and generate a fault signal when the compared rotary positions are outside a predetermined tolerance.

An exemplary actuator assembly wherein the common substrate includes a power circuit connected to the plurality of encoders, the power circuit being configured to provide circuit protection.

BRIEF DESCRIPTION OF THE DRAWING FIGURES

The scope of the present disclosure is best understood from the following detailed description of exemplary embodiments when read in conjunction with the accompanying drawings, wherein.

DETAILED DESCRIPTION OF THE INVENTION

An exemplary dual absolute encoder can be configured to include two encoders each having rotary position sensors disposed on a common substrate. One encoder can include a position sensor arranged (e.g., disposed, positioned, mounted) on the substrate to be on center or on-axis with respect to a motor shaft when the substrate is mounted to the motor. A second encoder can include a position sensor arranged on the substrate to be off-center or off-axis with respect to the axis of the motor shaft. The dual encoder arrangement can provide improved resolution and provide redundancy when determining the position or rotation of the motor shaft.

Figure 1:
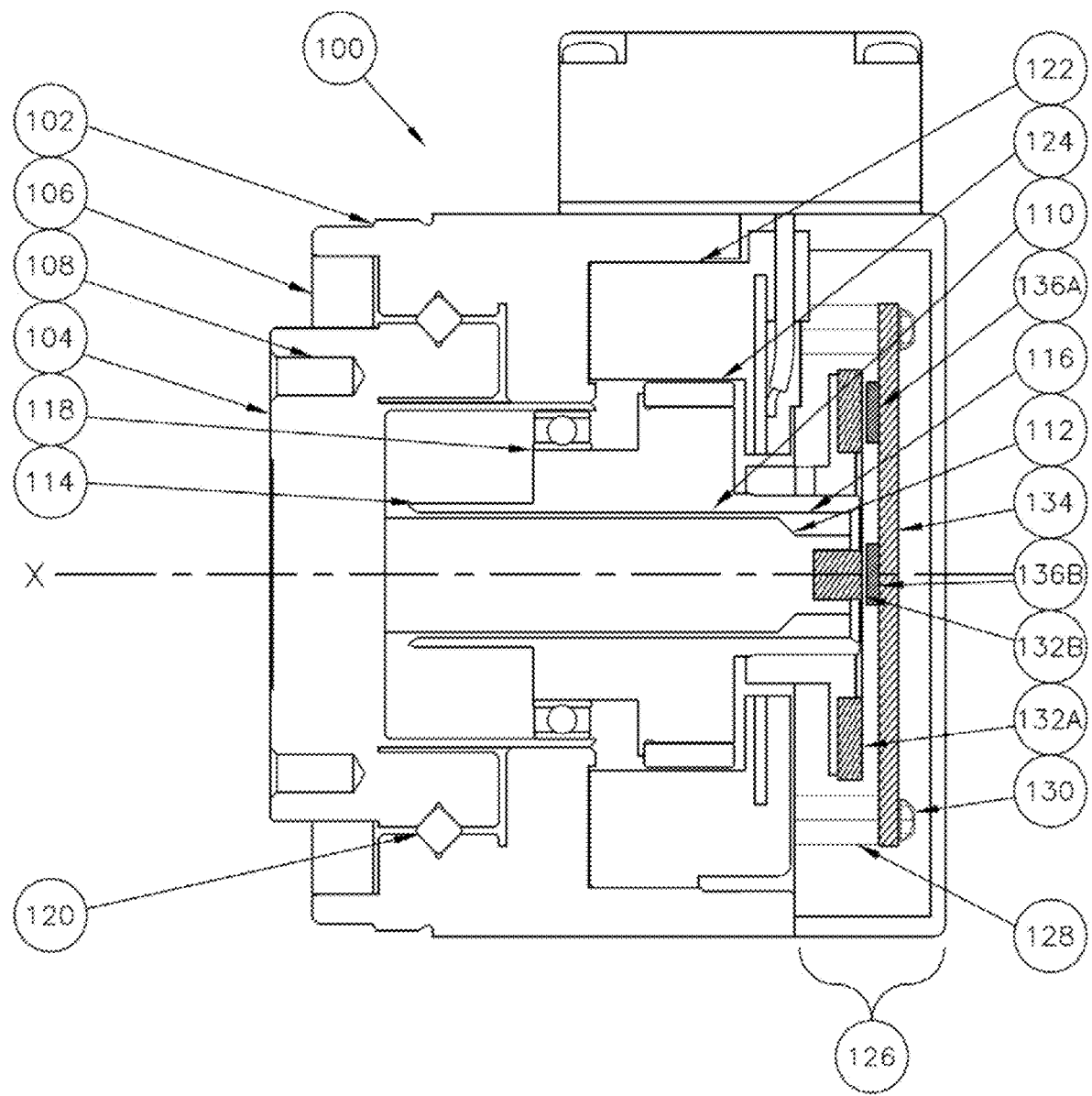
FIG. 1 illustrates an actuator assembly in accordance with an exemplary embodiment of the present disclosure.

FIG. 1 illustrates an actuator assembly in accordance with an exemplary embodiment of the present disclosure. The actuator assembly 100 can include an actuator housing 102 that has a seal 106 that the actuator output flange 104 rotates within. This actuator output flange 104 includes features (e.g., holes) 108 for mounting the output of the actuator assembly 100 to an external load (not shown). A hollow motor shaft 110 is coaxial with an actuator output shaft 112. The hollow motor shaft 110 has a front-end 114 and a rear-end 116 extends along the center axis (x) of the housing 102. The front-end 114 is coupled to the gear input 118 (e.g., inner diameter of an elliptical wave generator) that creates the reduction between two internal splines (not shown) connecting the housing 102 and the motor assembly. The actuator output flange 104 is supported by a bearing 120. The actuator assembly 100 also includes a stator 122 that is fixed to an interior surface of the housing 102 and is spaced from the motor shaft 110 via a gap 124 that surrounds the motor shaft 110.

An encoder assembly 126 is configured for detecting position and rotation at the rear-end 116 of the motor shaft 110, which is coaxial with an end of the actuator output shaft 112. The encoder assembly 126 can be configured as an absolute rotary encoder that is at least partially mounted or attached to the stator 122 and/or housing 102 of the actuator assembly 100 via a mounting bracket or spacer 128. The mounting bracket 128 can be securely attached to the actuator assembly 100 via screws or bolts 130 or other suitable holding mechanisms as desired.

As shown in FIG. 1, the encoder assembly 126 includes a code disk 132A for generating the position signal associated with the motor shaft 110, and a code disk 132B for generating the position signal associated with the actuator output shaft 112 that may include the output of a gear where the gear input 118 is attached to the motor shaft 110. Also included is a substrate 134 that includes at least circuits for monitoring the position of the motor shaft 110 and the actuator output shaft 112. The substrate 134 can be implemented as a printed circuit board, a planar 3D printed material, a flexible circuit board, or any other known component configured to mechanically support and electrically connect electrical components of a single modular board as desired. The substrate 134 can have a multilayer construction in which the wiring portion and component and circuit layout meet specified performance power, and thermal characteristics. The substrate 134 can include a plurality of position detection sensors 136A, 136B for detecting a rotary position of coaxial shafts or other rotating elements and connected to a common bus for communicating data with a controller. The position detection sensors 136A, 136B can be mounted on a surface and/or embedded within interior layers of the substrate 134 as desired. The position detection sensors 136A, 136B can be electrically connected to each other and/or to other components and circuits on the substrate through the use of conductive tracks, pads, vias, and other known means of establishing electrical connections as desired on a substrate. The position detection sensor 136A is arranged on the substrate 134 to detect signals from the code disk 132A, which in combination the position detection sensor 136A and the code disk 132A form an encoder. The position detection sensor 136B is arranged on the substrate 134 to detect signals from the code disk 132B. The combination of the position detection sensor 136B and the code disk 132B also forms an encoder.

The position detection sensors 136A, 136B can be non-contacting and configured to detect the position of the motor shaft 110 and/or the actuator output shaft 112 through magnetic or inductive signals emitted from associated code disks as shown in FIG. 1. According to other exemplary embodiments disclosed herein, the position detection sensor can be configured to use optical or capacitive signaling means or a mix of both. These alternate embodiments are disclosed in further detail in relation to FIGS. 2a and 2b.

According to an exemplary embodiment of the present disclosure, the code disk 132A is configured with a plurality of alternating magnetic poles (N, S) provided on an axial (FIG. 1.) or radial (FIG. 3a) surface relative to the axis of the motor shaft 110. The position detection sensors 136A, 136B can be implemented as Hall-effect elements for magnetically detecting the position of a rotation shaft via the code disks 132A, 132B respectively. The position detection sensors 136A, 136B in combination with the code disks 132A, 132B can be configured as single-turn absolute encoders, which measure displacement or rotation of the shaft across a 360° range from a specified position at start-up. In this configuration, the output of the position detection sensor 136A, 136B is repeated for each revolution or rotation cycle of the motor shaft 110. The use of absolute encoders in this configuration provides redundancy for improved safety generally in controlling the operation of the motor and more particularly, in determining the position of the motor shaft 110. In accordance with another exemplary embodiment of the present disclosure, one or more encoders of the encoder assembly 126 can be configured as multiple-turn (or multi-turn) absolute encoders. In the multi-turn absolute encoder configuration, the encoder assembly 126 can include multiple code disks and a battery (not shown) and/or a counter (not shown) for maintaining position information at power shutdown. As already discussed, the actuator output shaft 112 can include gearing 118. As a result, the motor shaft 110 may rotate a number of revolutions according to a gear ratio to accumulate one revolution of the actuator output shaft 112. Because the absolute starting position of each sensor can be determined at startup, no battery backup is required for storing the absolute position data within one revolution of the actuator output shaft 112.

Figure 2A:
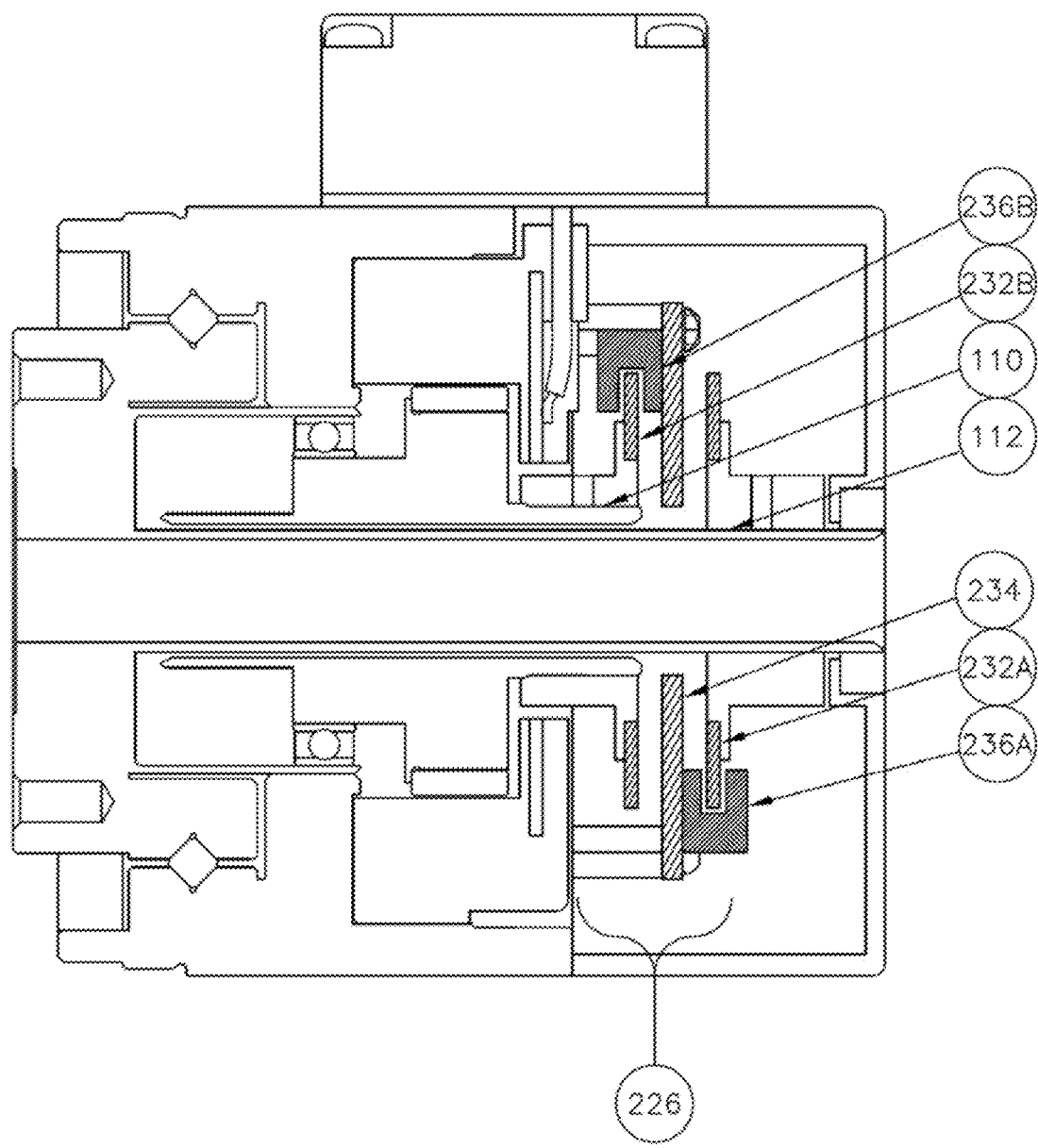
FIGS. 2a and 2b illustrate an exemplary optical or capacitive encoder assembly according to an exemplary embodiment of the present disclosure.
Figure 2B:
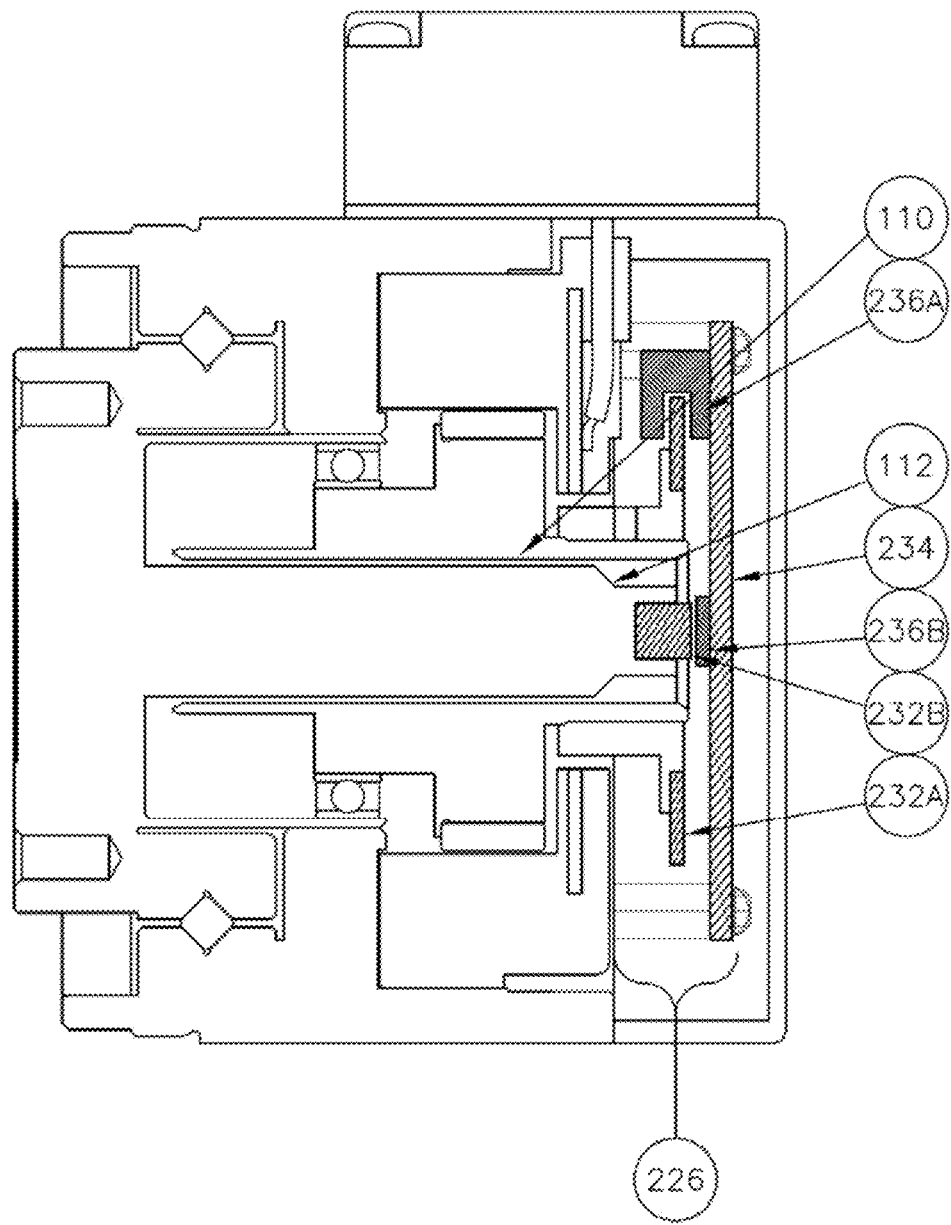

FIGS. 2a and 2b illustrate an exemplary optical or capacitive encoder assembly according to an exemplary embodiment of the present disclosure. As shown in FIGS. 2a and 2b, the position detection sensors 236A, 236B can be implemented as optical or capacitive photo electric sensors and are used in combination with code disks 232A, 232B, respectively. The code disks 232A, 232B can have a plurality of opaque or transparent areas configured for passing light through its surfaces. A light source (not shown) can be positioned adjacent a respective code disk 232A, 232B and on a side opposite the position detection sensors 236A, 236B in order to illuminate the code disk 232A, 232B. As the code disk 232A, 232B rotates the position detection sensors 236A, 236B detect the modulated light as it passes through the transparent and/or opaque areas. A controller is configured to access memory to determine a predetermined position or rotation of the shaft associated with the detected modulated signals. The exemplary encoder assembly 226 as shown in FIG. 2a can also include any number of optical elements for focusing the light onto the position detection sensors 236A, 236B. The optical elements can include light collimating light emitting diodes, mirrors, prisms, lenses, fiber optics, laser diodes, optical slits, diffraction gratings, or any other suitable light directing element or mechanism as desired. As shown in FIG. 2a, the optical or capacitive encoder assembly can be configured such that each sensor is mounted to a single substrate 234, which is formed as a ring, on either a surface facing the rear-end 116 or surface facing the front-end 114 of the substrate as desired. FIG. 2b illustrates an exemplary embodiment in which a single position detection sensor 236A mounted to a single substrate 234 is an optical sensor used for detecting the light passing through each code disk 232A.

According to another exemplary embodiment of the disclosure, the position detection sensors 236A, 236B can be used in combination with code disks 232A, 232B configured to have a predetermined sinusoidal pattern etched onto the respective surfaces. In accordance with this exemplary embodiment, the encoder assembly 226 includes a transmitter (not shown) that generates a high frequency signal for injection into the motor shaft 110. As the code disks 232A, 232B rotate with the motor shaft 110 the sinusoidal pattern modulates the high-frequency signal of the transmitter. The position detection sensors 236A, 236B can be configured as capacitive sensors, which detect the modulated signal from the code disks 232A, 232B and provide the signal to the driver/controller. The driver/controller translates the modulated signal received from the position detection sensors 236A, 236B into rotary motion, and uses the rotary motion value to determine the position of the motor shaft. As shown FIG. 2b, the encoder assembly 226 can include a combination of optical or capacitive position detection sensors 236A in off-axis positions relative to the motor shaft 110 with a magnetic position detection sensor 236B in an on-axis position.

Figure 3A:
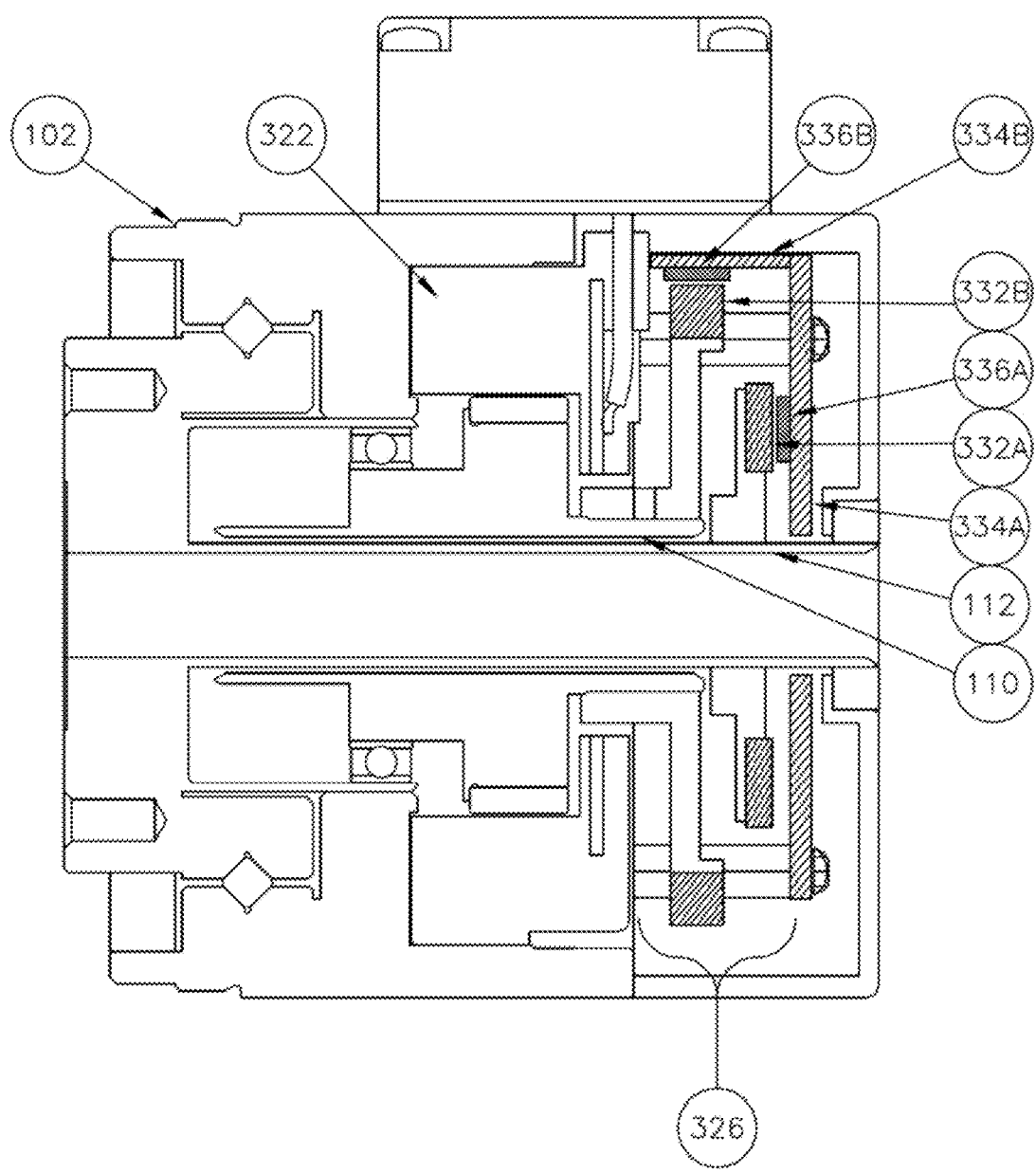
FIGS. 3a-3c illustrate exemplary encoder assemblies according to an exemplary embodiment of the present disclosure.
Figure 3B:
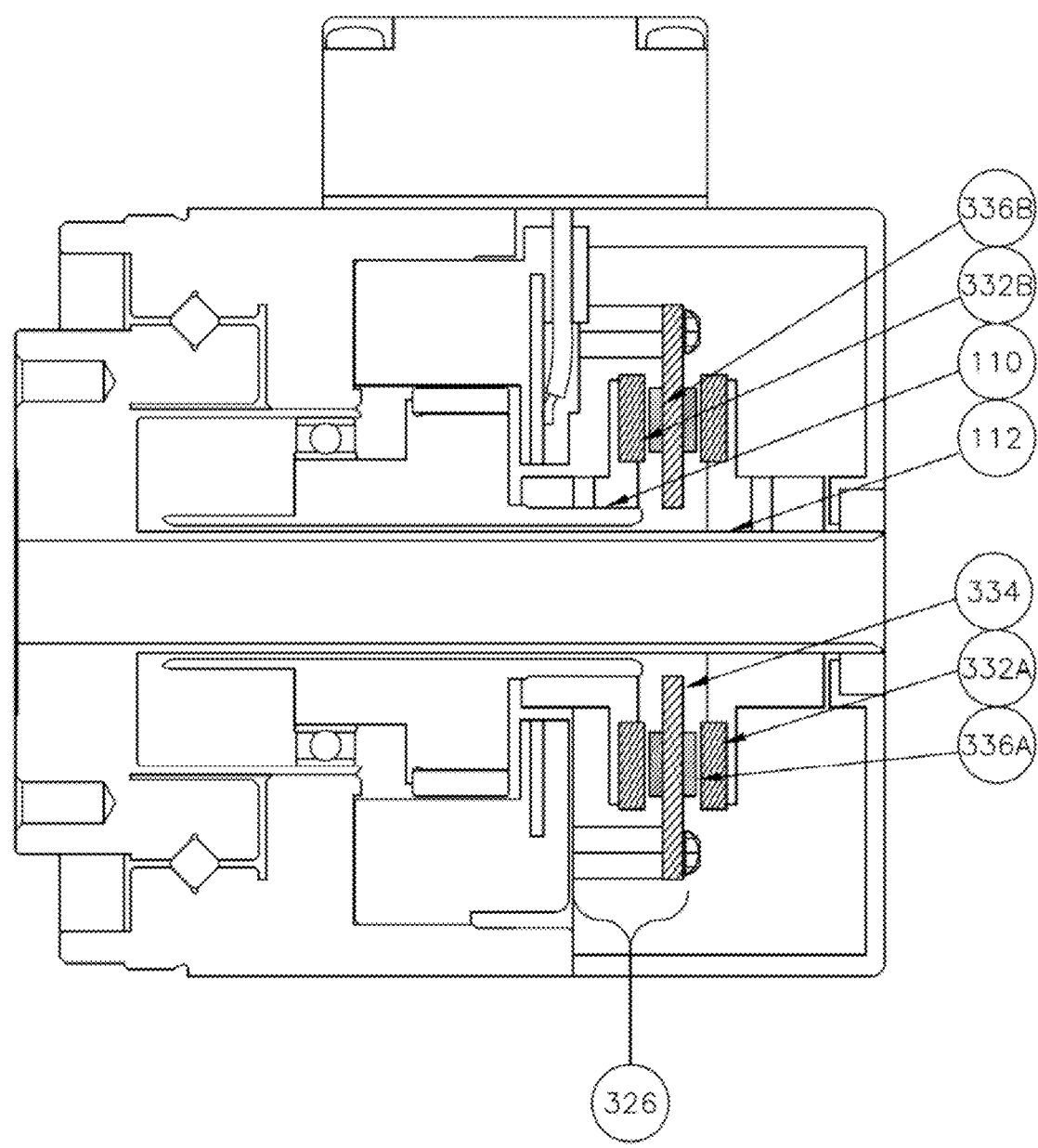
Figure 3C:
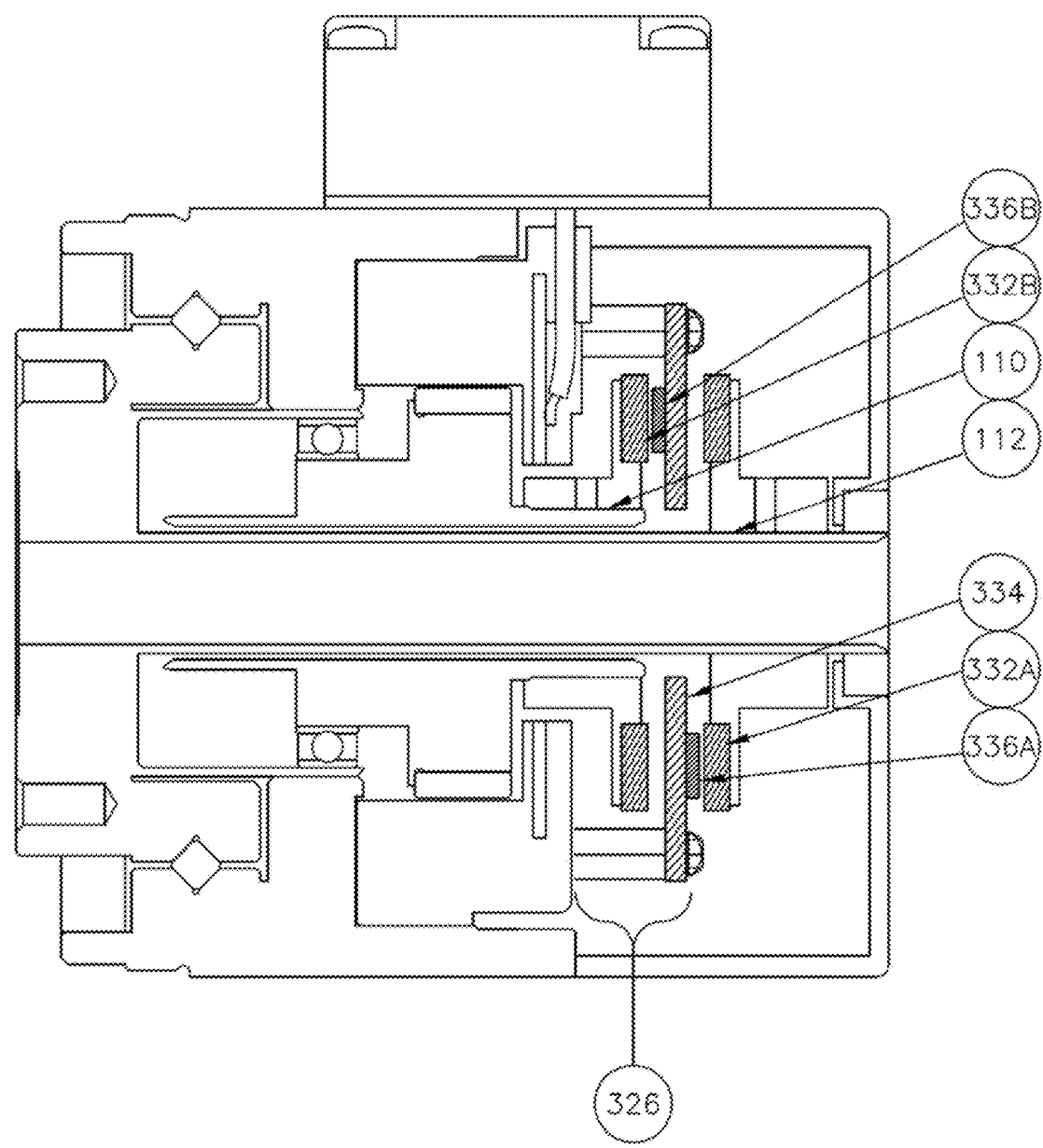

FIGS. 3a-3c illustrate an encoder assembly according to an exemplary embodiment of the present disclosure. As shown in FIG. 3a, the encoder assembly 326 can be configured to have two mated, ring-shaped substrates serving as the code disks 332A, 332B. The code disk 332B can be attached to the motor shaft 110 so that it can synchronously rotate with the motor shaft 110 during operation. The code disk 332A is mounted to the actuator output shaft 112 of the actuator assembly 100. The code disk 332B is configured to include position detection sensor 336B and other components including, for example, a power circuit (not shown) embedded within its internal layer structure. During operation of the motor assembly, the code disk 332B rotates with the motor shaft 110 and the position detection sensor 336B detects changes in inductive coupling generated as the code disk 332B rotates with the motor shaft 110. The magnetic signals detected by the position detection sensor 336B are compared with predetermined magnetic signal measurements to determine a position of the motor shaft 110. As shown in FIG. 3a, the substrate 334 can include a first portion 334A and a second portion 334B. The position detection sensor 336A can be mounted on the first substrate portion 334A to be in off-axis alignment with the motor shaft 110 to detect signals from the code disk 332A mounted to the output shaft 112. The position detection sensor 336B can be mounted on the second substrate portion 334B to be in off-axis alignment with the motor shaft 110 to detect signals from code disk 332B mounted to the motor shaft 110. The position detection sensor 336B is arranged to detect signals from a radial surface of the code disk 332B. As shown in FIG. 3b, this same design can be implemented for the actuator output shaft 112 and its ring shaped substrate 334, where position detection sensor 336B is mounted on the opposite side of the substrate 334 from the position detection sensor 336A with redundancy. FIG. 3c illustrates the encoder assembly of FIG. 3b without redundancy. According to an exemplary embodiment, the encoder assembly 326 of FIGS. 3b and 3c can be configured to use magnetic or inductive position detection.

According to an exemplary embodiment of the present disclosure, the encoder assembly 326 can be configured to include any combination of magnetic, optical, inductive, and/or capacitive encoders as disclosed herein. For example, the encoder assembly 326 can include an encoder having a magnetic code disk 332B disposed in the hollow volume on a side facing the rear-end 116 of the motor shaft 110. Another exemplary encoder can be configured with an optical code disk 332A attached to the actuator output shaft 112 so that it rotates during operation of the actuator assembly. Position detection sensors 336A, 336B can be aligned in off-axis positions on the substrate 334 relative to the axis (X) of the motor shaft 110. The position detection sensor 336A is configured to detect the light reflected from the optical code disk 332A, and the position detection sensor 336B is configured to detect the signals emitted from the magnetic code disk 332B.

Figure 4A:
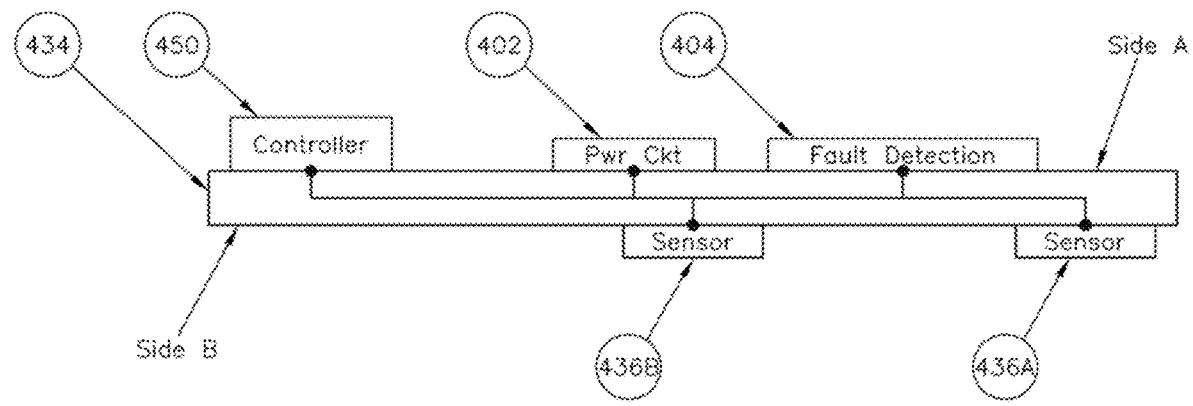
FIGS. 4a and 4b illustrate an exemplary controller circuit in accordance with an exemplary embodiment of the present disclosure.
Figure 4B:
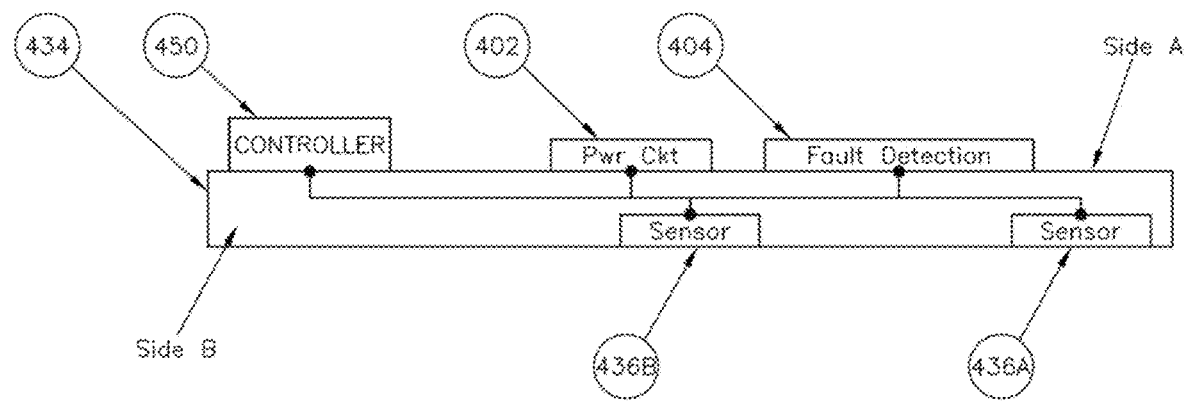
Figure 4C:
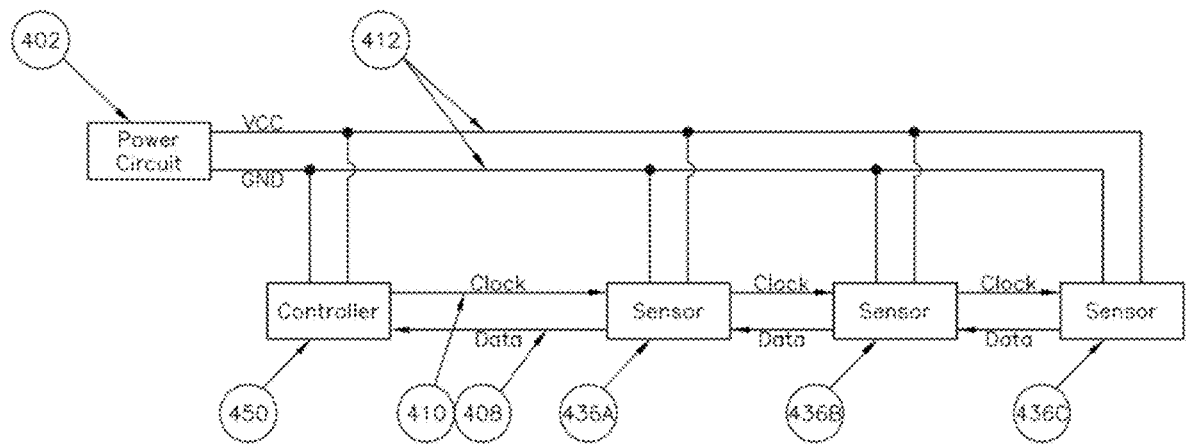
FIGS. 4c and 4d illustrate wiring schemes of the position sensor and substrate assembly in accordance with an exemplary embodiment.

FIGS. 4a-4c illustrate an exemplary controller circuit in accordance with an exemplary embodiment of the present disclosure. The controller 450 can be configured as a servo drive that includes a hardware device, such as a processor, a field programmable gate array (FPGA) or an application-specific integrated circuit (ASIC). Each of these devices can be specially programmed with software or programming code to perform operations to process, analyze, and/or manipulate driving and/or controlling the actuator assembly 100 and/or the data detected by the position detection sensors 436A, 436B and/or other components or circuits of the actuator assembly 100. The controller 450 can include components and circuitry that can be integrated directly onto the substrate 434 as well as the position sensors 436A, 436B that detect rotation of the actuator output shaft 112 and motor shaft 110 respectively. The circuits can include, for example, a power circuit 402, a fault detection circuit 404, and a driver/controller 450, among others. As shown in FIG. 4a, the circuits can be mounted on one or more sides or surfaces of the substrate. For example, the power circuit 402, fault detection circuit 404, and driver/controller 450 can be mounted on a side A of the substrate 434 and the position detection sensors 436A, 436B can be mounted on a side B of the substrate 434. The position detection sensors 436A, 436B are configured to share a power signal output from the power circuit 402. FIG. 4b illustrates an embodiment in which the position detection sensors 436A, 436B are embedded within the substrate 434. It should be understood that any of the other components and/or circuits can be embedded within the substrate in combination with or in place of the position detection sensors 436A, 436B. According to an exemplary embodiment, the controller 450 can be mounted in any suitable arrangement on the substrate 434 such that the various components and circuitry can be mounted to any side A or B of the substrate or embedded within the substrate in any combination as desired.

In an alternative embodiment, the controller 450 can be mounted on a separate substrate within the motor assembly or external to the housing 102 of the actuator assembly. The controller 450 can be configured to determine whether a fault based on rotary positions of the shafts detected by at least two of the plurality of position detection sensors 436A, 436B. For example, the controller 450 can be configured to compare the rotary positions of the shaft detected by at least two position detectors 436A, 436B and generate a fault signal when the compared rotary positions are determined to be outside a predetermined tolerance. For example, if a 15 bit (32768 counts per revolution) position detector is monitoring the motor shaft 110 position, and a 14 bit (16384 counts per revolution) position detector is monitoring the actuator output shaft 112 position with a 100:1 reduction ratio, and the motor rotates 50.75 revolutions, the motor shaft position detector will output the 0.75 position of 1 revolution as 24756 counts while the actuator output will count 50 revolutions and 0.75 revolutions with its 100:1 reduction as 8192+123 or 8315 counts. The conversion of 1 motor shaft revolution or 32768 counts equating to 164 actuator position detector counts would be used by the controller to set a fault if the motor position within 1000 counts does not correlate to an actuator position within 5 counts depending on the accuracy and repeatability of the position detector integrated since the motor shaft to actuator output position detection is 200 in this example.

Figure 4D:
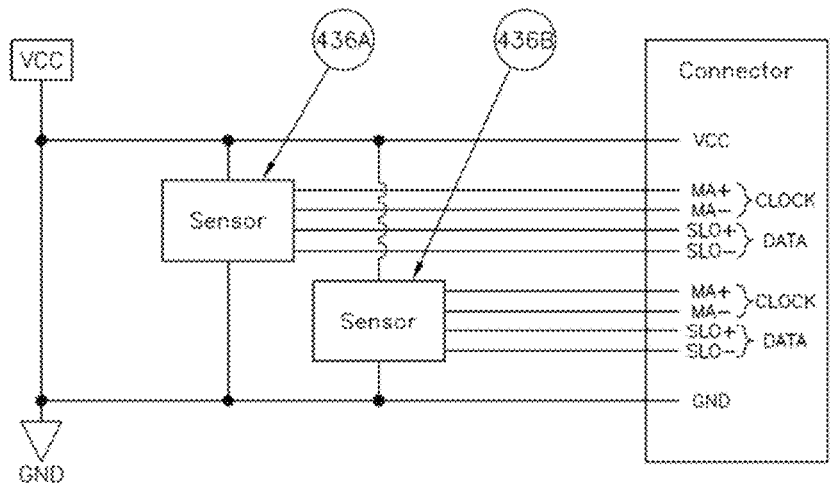

FIGS. 4c and 4d illustrate a wiring scheme of the position sensor and substrate assembly in accordance with an exemplary embodiment. According to one embodiment an encoder assembly can be configured with multiple position sensors where each position sensor includes separate data and clock lines or signals. For example, the position detection sensors 436A, 436B, 436C can be configured to have data lines 408 and a clock lines 410 connected to a driver/controller 450 and a shared power and ground 412 from the power circuit 402. The exemplary embodiment shown in FIG. 4c differs from and provides advantages over the previous embodiment because it provides an exemplary illustration for connecting the position detection sensors 436A, 436B, 436C in a daisy chain arrangement such that the sensors share a common data bus. As a result of this arrangement, the total number of lines necessary for wiring the position detection sensors 436A, 436B, 436C of the encoder assembly can be significantly reduced, e.g., the exemplary technique of the present disclosure eliminates eight redundant data communication wires (Data+, Data−, Clock+, Clock− for 2 sensors). The exemplary encoder assembly 126 of the present disclosure is configured to provide position data or other motor assembly data as desired on the common data bus 414 as a multi-bit word. The encoder assembly can be configured to communicate the data via a parallel or serial interface. Serial data can be output according to a synchronous serial interface (SSI) protocol or a bidirectional/serial/synchronous (BiSS) interface protocol. As shown in FIG. 4d, the position detection sensors Position Sensors 436A and 436B are connected according to a differential line transmitter and receiver. For each sensor 436A and 436B, two lines are for the differential data receive (SLO+ and SLO−). Two lines are for differential clock and data transmit signal (MA+ and MA−). The position sensors are connected in a master (MA)/slave (SLO) arrangement. The arrangement can be scaled to include any number of sensors as desired.

Figure 5A:
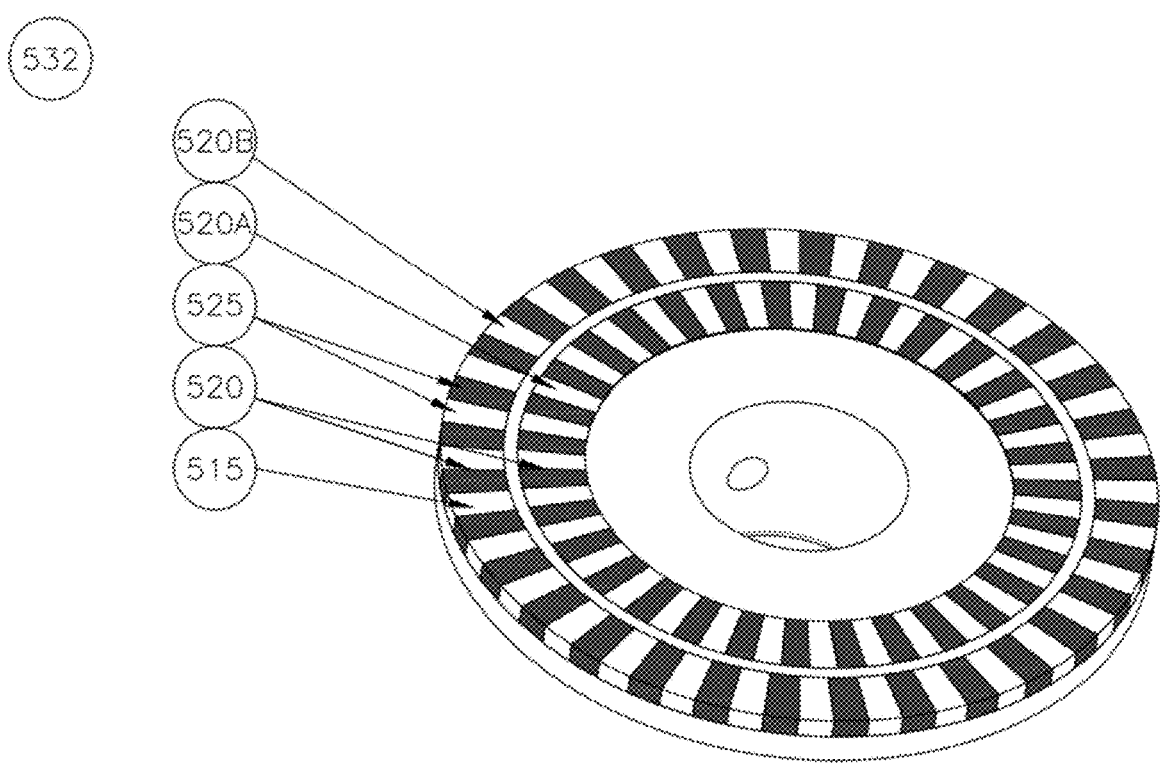
FIGS. 5a-5c illustrate types of magnets for an encoder assembly in accordance with an exemplary embodiment of the present disclosure.
Figure 5B:
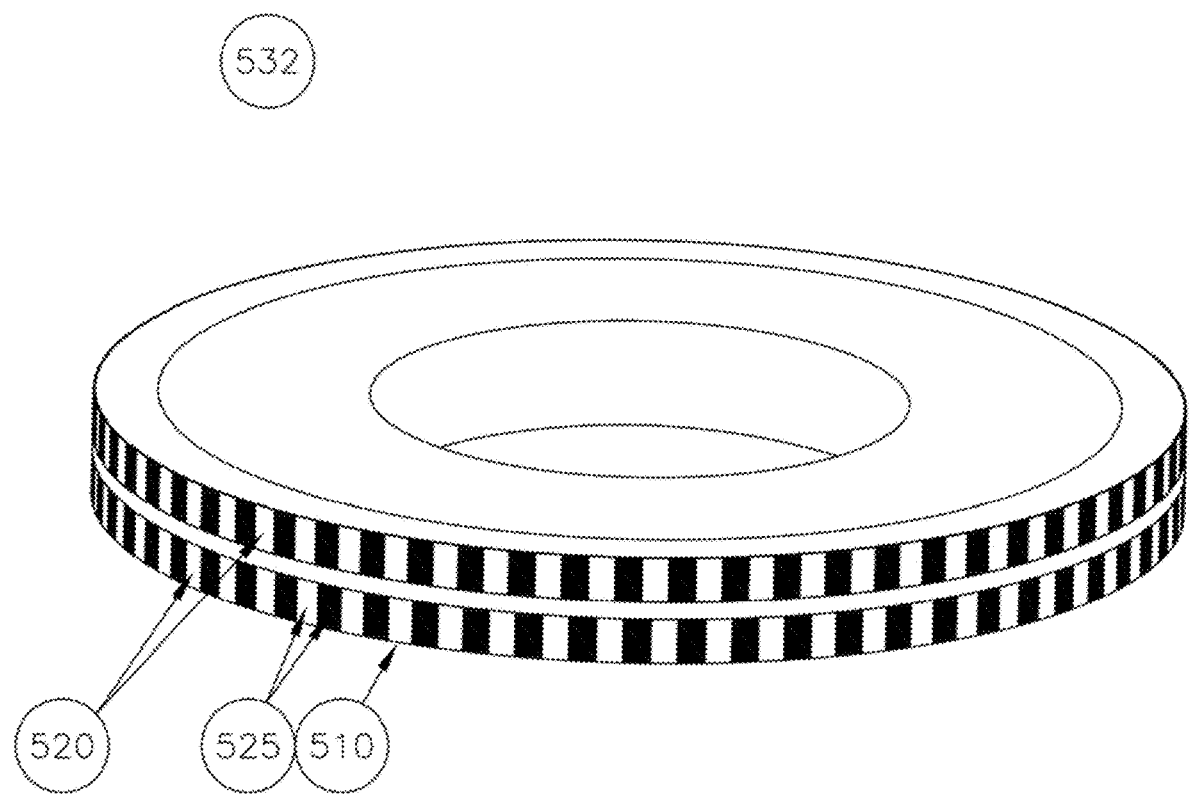
Figure 5C:
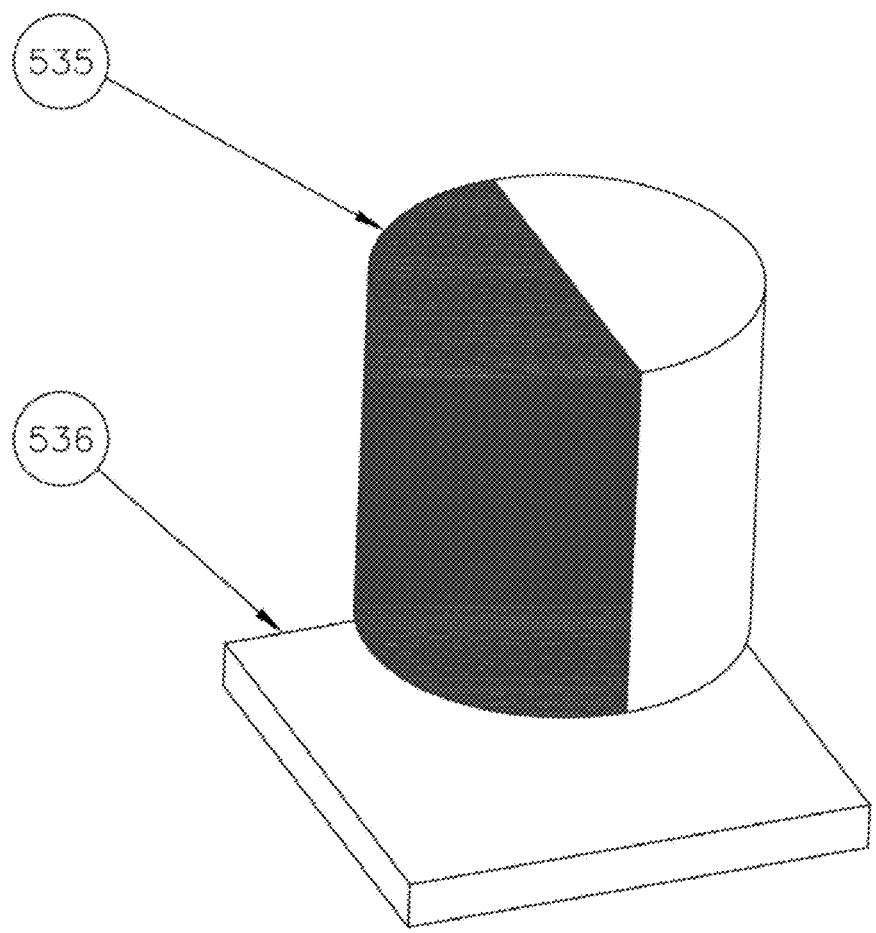

FIGS. 5a-5c illustrate types of magnets for an encoder assembly in accordance with an exemplary embodiment of the present disclosure.

As shown in FIG. 5a, the code disk 532 is representative of the code disks 132A, 332A, and 332B discussed relative to FIGS. 1 and 3a-3c, where applicable. The code disk 532 can be configured as a multi-pole magnet that can be coaxially secured to one or more motor shafts 110 or other rotating elements for which rotation is to be detected. The code disk 532 in combination with the position detection sensor 136A provides for off-axis rotation detection relative to the actuator output shaft or motor shaft 110 as shown in FIG. 1. The code disk 532 can have a ring or circumferential shape and be configured to include a plurality of alternating N and S pole pairs 525. The pole pairs N and S can be arranged on an axial surface 515 of the code disk 532 relative to the axis of the motor shaft 110. According to an exemplary embodiment of the present disclosure, the code disk 532 can have any of 16, 32, and 64 pole pairs or any other suitable number of poles as desired. The axial surface 515 of the code disk 532 can include one or more tracks 520, where each track 520 includes a plurality of N and S magnetic poles 525 arranged in an alternating pattern along the circumference. For each track 520, the plurality of N and S poles 525 can be spaced at equidistant or equiangular positions around the circumference of the code disks 532. FIG. 5a, illustrates a code disk 532 comprised of two (2) tracks 520A, 520B and having a resolution of up to 18 bits (i.e., 262144 counts). For an optical encoder assembly, the transparent or opaque areas are used in place of the N and S pole pairs of the magnetic code disk. It should be understood, however, that the code disks 532 can have any number of suitable tracks according to the desired resolution of the position to be detected.

As shown in FIG. 5b, the code disk 532 can be arranged such that the N and S pole pairs are formed on a radial surface 510 or outer edge.

As shown in FIG. 5c, the encoder assembly 126 can include a two (2) pole magnet 535 that is configured to be attached to or disposed within the hollow volume of the actuator output shaft 112 for which rotation is to be detected. According to another exemplary embodiment, the two pole magnet 535 can be disposed inside the hollow inner volume of the motor shaft 110 nearest the rear-end 116. The magnet 535 in combination with the position detection sensor 536 provides for on-axis detection relative to the actuator output shaft 112.

FIGS. 6a-6g illustrate various mounting arrangements of the position detection sensors in accordance with an exemplary embodiment of the present disclosure.

Figure 6A:
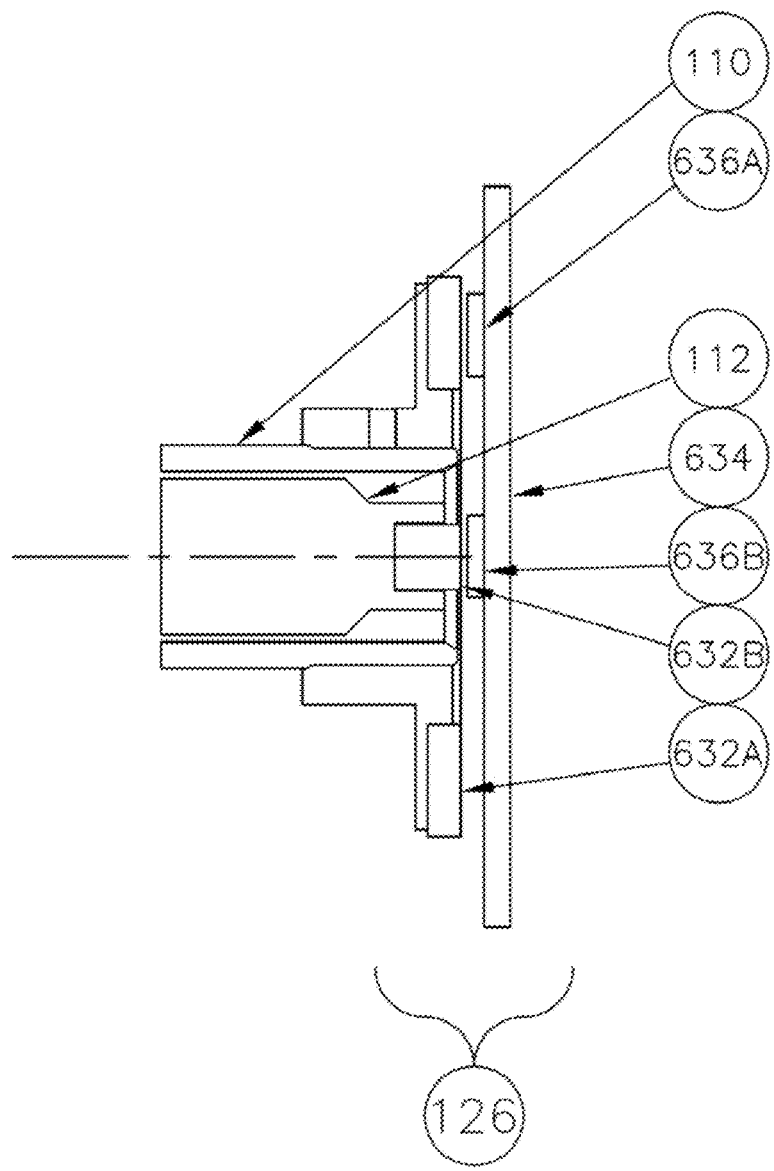
FIGS. 6a-6g illustrate various mounting arrangements of the position detection sensors in accordance with an exemplary embodiment of the present disclosure.

As shown in FIG. 6a, encoder assembly 126 can include a position detection sensor 636B disposed on the substrate 634 so that when the substrate 634 is mounted on the actuator assembly, the position detection sensor 636B is in an on-axis position relative to a code disk 632B mounted within the hollow inner volume of the motor shaft 110 or other rotating element for which the position is to be detected. In the on-axis position, the position detection sensor 636B is positioned to sense the poles of the code disk 632B, which is mounted within the hollow volume of the motor shaft 110 nearest the rear-end 116 or on the rear-end of the actuator output shaft 112 as shown in FIG. 1. A code disk 632A can be mounted to the motor shaft 110, and a position detection sensor 636A can be mounted to the substrate 634 in an off-axis position relative to the motor shaft 110 to detect signals from the code disk 632A. This arrangement and orientation of the position detection sensors provides redundancy and improved accuracy over known encoder assembly designs.

Figure 6B:
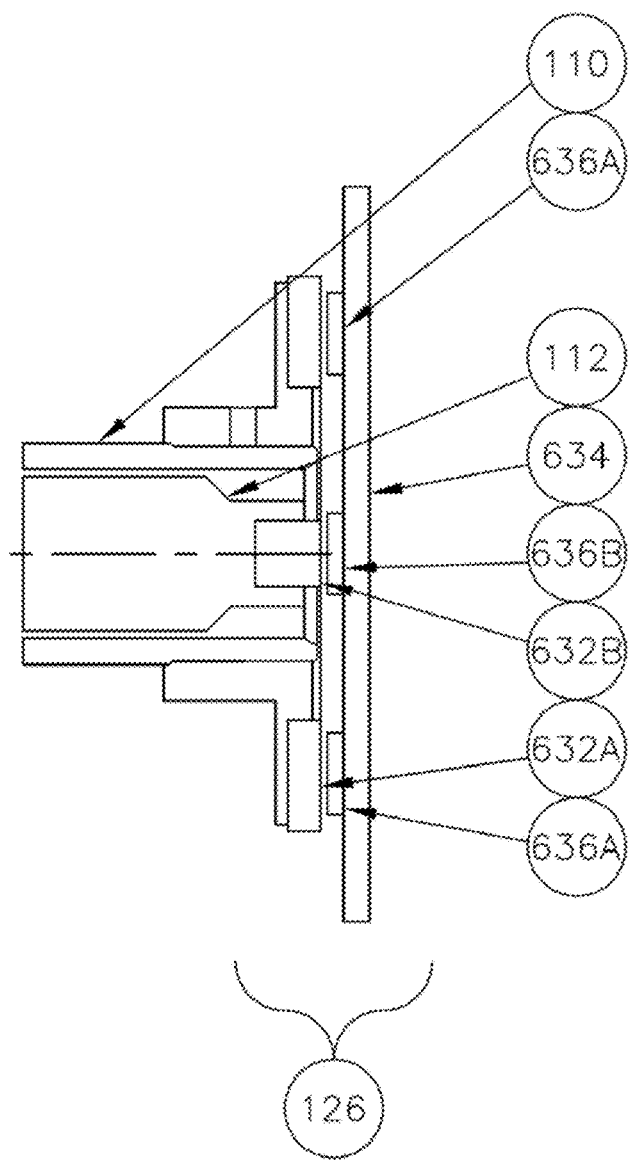

As shown in FIG. 6b, the encoder assembly 126 can include a position detection sensor 636B disposed in an on-axis position on the substrate 634 relative to the motor shaft 110 as in FIG. 6a, and also include one or more position detection sensors 636A disposed in off-axis positions, on the substrate 634 relative to the motor shaft 110. As already discussed, in the off-axis position the position detection sensor 636A is positioned to sense the N and S poles 525 of the code disk 632A. In an arrangement where at least two position detection sensors 636A are used, the sensors 636A can be disposed in positions offset by an angle of 90°, 180° or any other suitable angle as desired. The position detection sensors 636A, 636B are located on the same substrate surface and are therefore, mounted at the same axial position with the position detection sensor 636B being on center.

Figure 6C:
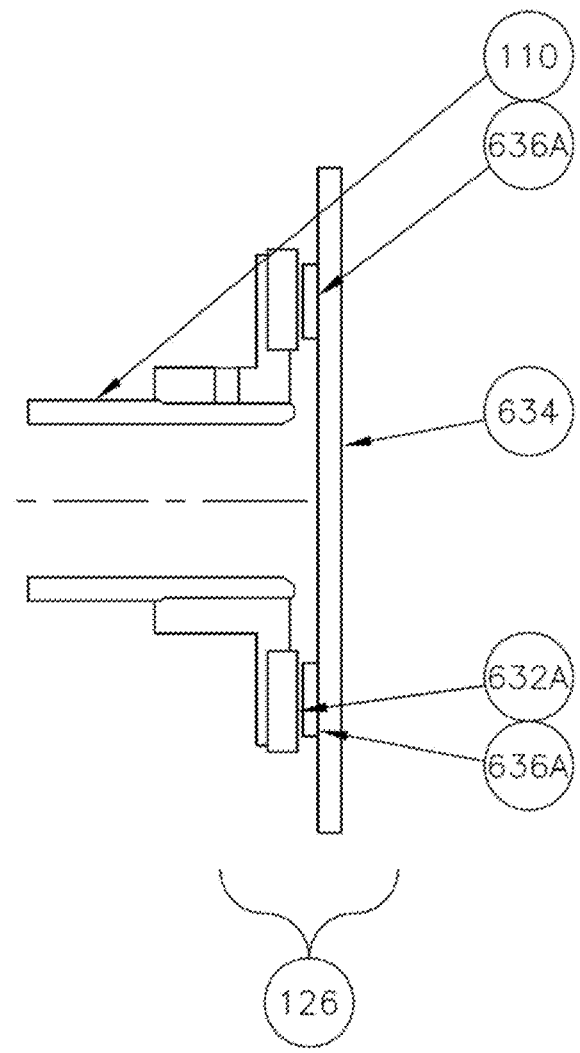

As shown in FIG. 6c, the encoder assembly 126 can include one or more position detection sensors 636A disposed in respective off-axis positions on the substrate 634 relative to the motor shaft 110. Increasing the number of position detection sensors 636A leads to redundancy or better accuracy. According to this embodiment no on-axis position detection sensors 636B are used for detecting the position of the motor shaft 110.

Figure 6D:
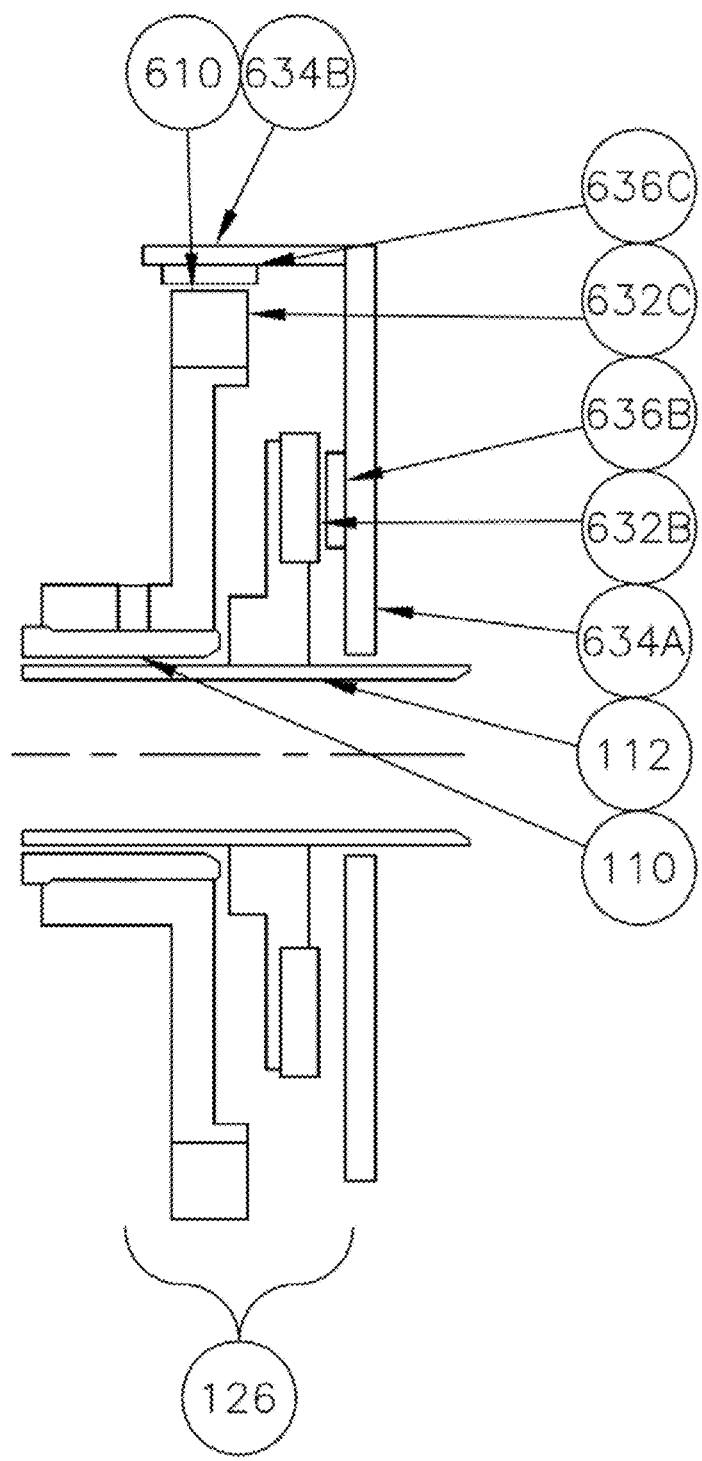

As shown in FIG. 6d, the encoder assembly 126 can include one or more position detection sensors 636B disposed radially relative to the motor shaft 110 and mounted on a first portion 634A of the substrate 634, and a second portion 634B of the substrate 634 extends in a plane perpendicular to the first substrate portion 634A. The first substrate portion 634A is arranged to be adjacent to an axial surface of a code disk 632B, and the second substrate portion 634B is arranged to be adjacent to a radial surface of the code disk 632B. A position detection sensor 636C can be mounted to a surface of the perpendicular second substrate portion 634B. The position detection sensor 636C is aligned with a code disk 632C having pairs of N and S poles 525 arranged on a radial surface 610 or outer edge. The first substrate portion 634A can be mounted to the stator assembly 122 (FIG. 1) and thus therefore stationary during operation. The code disk 632B is mounted to the actuator output shaft 112.

Figure 6E:
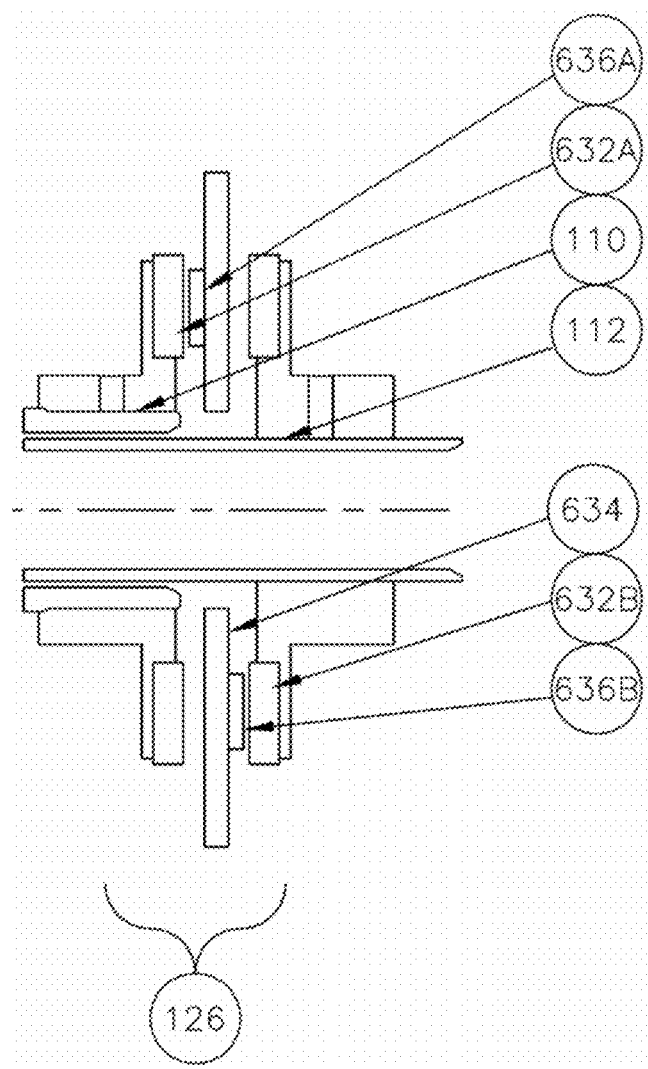
Figure 6F:
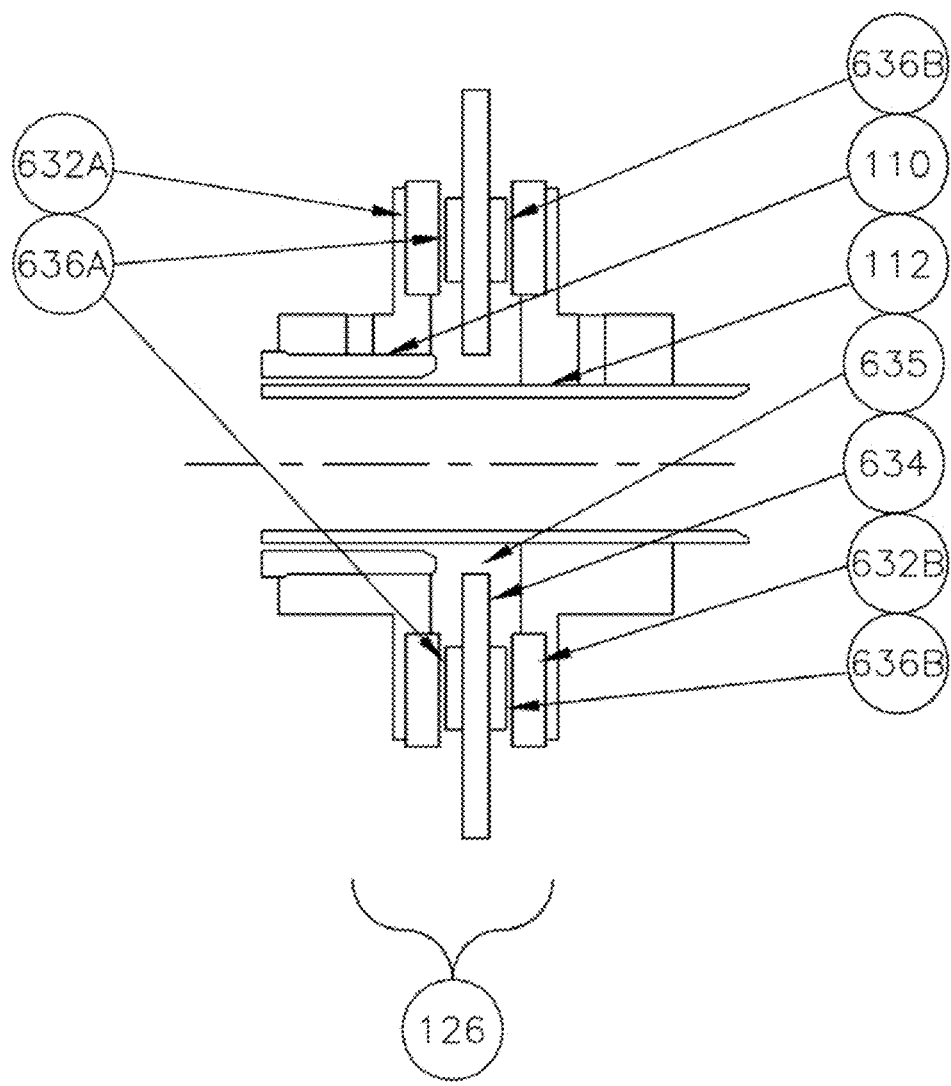

FIGS. 6e and 6f illustrate an exemplary encoder assembly in which the substrate 634 can be mounted to a stator assembly 122 as shown in FIG. 1. The single substrate 634 is formed to have a central hole or aperture 635 that allows complete passage of the actuator output shaft 112. The substrate 634 has one or more position detection sensors 636A, 636B mounted thereon. As shown in FIG. 6e, position detection sensors 636A, 636B can be mounted to one of a surface facing the front-end 114 or surface facing the rear-end 116 of the substrate 634. Based on the position detection sensors 636A, 636B, the position of the motor shaft can be detected based on the rotation of the code disks 632A, 632B mounted to the motor shaft 110 and actuator shaft 112. As shown in FIG. 6f, the position detection sensors 636A, 636B can be mounted on both sides of the single substrate, which result in increased accuracy and redundancy in detecting the motor position based on the rotation of code disks 632A, 632B.

Figure 6G:
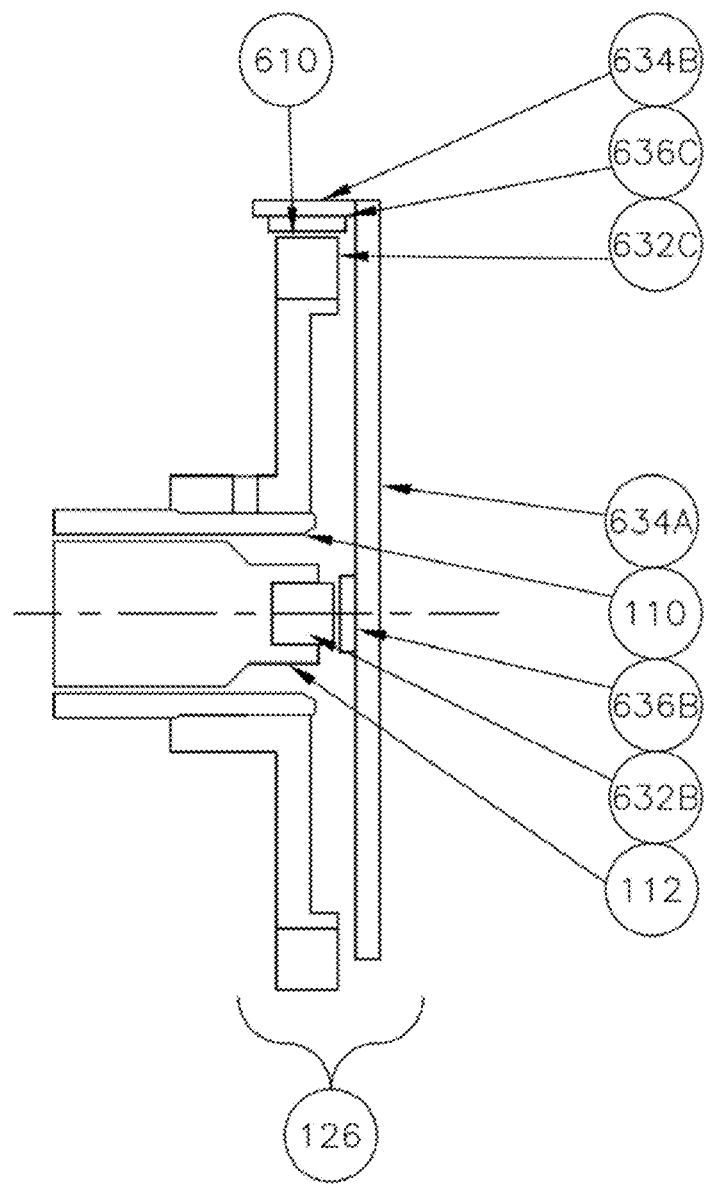

FIG. 6g illustrates an exemplary encoder assembly having a single substrate with a radial off-axis encoder and an on-axis encoder in accordance with an exemplary embodiment of the present disclosure. As shown in FIG. 6g, the encoder assembly 126 can include a substrate 634 having a first portion 634A and a second portion 634B that extends in a direction perpendicular to the first portion 634A. The position detection sensor 636B can be mounted on the first substrate portion 634A to be in on-axis alignment with a code disk 632B mounted in the hollow volume of the actuator output shaft 112. A position detection sensor 636C can be mounted on the second substrate portion 634B to be in off-axis alignment with a code disk 632C mounted to an outer surface of the motor shaft 110. The position detection sensor 636C is aligned to detect signals from the pairs of N and S poles 525 arranged on a radial surface 610 or outer edge of the code disk 632C.

The exemplary rotary encoder assemblies of the present disclosure are mounted on a single substrate, which allows for much smaller space requirements over known implementations. As a result, the encoder assemblies as described herein can be mounted closer to the motor/actuator allowing for a reduction in the length resulting in improved torque density. As a result, when the encoder assembly, which uses a dual encoder combination on a single substrate, is integrated directly on an integrated servo drive the encoder wires can be eliminated completely. In addition, the position detectors can be connected in a daisy-chain configuration, which leads to space and thermal efficiencies, as well as a reduction of the number of wires to be connected to the servo drive or controller. The encoder assembly having components and circuitry mounted on both sides of a double-sided substrate introduce not only space savings but cost savings as well. To further improve performance of the encoder assembly, the motor/actuator shaft can be formed of aluminum to reduce the amount of crosstalk and noise from magnetic interference, improve torque density, and reduce inertia or eliminate shaft runout. The use of other known mounting techniques and materials with respect to the magnets can be used to improve tolerances, electrical runout, and overall performance of the encoder assembly.

It will thus be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An encoder assembly, comprising:
   a first code component mounted to a first rotating shaft;
   a second code component mounted to a second shaft that is coaxial with the first rotating shaft;
   a common substrate;
   a first position detection sensor mounted to a surface of the common substrate in an on-axis or off-axis alignment with the first rotating shaft, the first position detection sensor detecting signals from the first code component mounted to the first rotating shaft; and
   a second position detection sensor mounted to the surface of the common substrate in an on-axis or an off-axis alignment with the second shaft, the second position detection sensor detecting signals from the second code component mounted to the second shaft.

2. The encoder assembly according to claim 1, wherein:
the common substrate includes a first substrate portion mounted in parallel with the axis of the first rotating shaft and a second substrate portion mounted orthogonally or in parallel with the axis of the second shaft, wherein the second substrate portion when mounted in parallel with the axis of the second shaft is connected to the first substrate portion, and
the first substrate includes the first code component and the second substrate includes the second code component.

3. The encoder assembly according to claim 2, wherein the first rotating shaft and the second shaft are coaxial.

4. The encoder assembly according to claim 2, wherein the first position detection sensor detects signals from a radial surface of the first code disk.

5. The encoder assembly according to claim 2, wherein the first rotating shaft is a motor shaft and the second shaft is an actuator output shaft.

6. The encoder assembly according to claim 2, wherein the first rotating shaft and the second shaft are motor shafts.

7. The encoder assembly according to claim 2, further comprising:
at least one redundant position detection sensor mounted to each of the first substrate portion and the second substrate portion, wherein the at least one redundant position detection sensor is mounted relative to at least one of the first and the second position detection sensors on a respective radial surface of the common substrate.

8. The encoder assembly according to claim 2, wherein the first substrate portion is mounted radially from an axis of the first rotating shaft.

9. The encoder assembly according to claim 2, wherein the first or second position detection sensors are mounted on an axial surface of the common substrate.

10. The encoder assembly according to claim 1, wherein the first rotating shaft and the second shaft are motor shafts.

11. The encoder assembly according to claim 1, wherein the first and second position detection sensors in combination with the first and second code disks, respectively, form dual single-turn absolute encoders.

12. The encoder assembly according to claim 1, wherein the first and second position detection sensors in combination with the first and second code disks, respectively form dual multi-turn absolute encoders.

13. The encoder assembly according to claim 1, further comprising:
at least one redundant position detection sensor mounted to the common substrate, wherein the at least one redundant position detection sensor is mounted relative to at least one of the first and the second position detection sensors on a surface of the common substrate.

14. The encoder assembly according to claim 1, wherein the common substrate flexible.

15. The encoder assembly according to claim 1, wherein the first or second position detection sensors are mounted on a radial surface of the common substrate.

16. The encoder assembly according to claim 15, wherein the first position detection sensor and the second position detection sensor are mounted on opposite sides of the common substrate.

17. The encoder assembly according to claim 15, further comprising:
at least one redundant position detection sensor, wherein the at least one redundant position detection sensor is mounted relative to at least one of the first and the second position detection sensors on the radial surface of the common substrate.

* * * * *